(12) United States Patent
Shiraishi et al.

(10) Patent No.: US 11,043,860 B2
(45) Date of Patent: Jun. 22, 2021

(54) ROTOR, MOTOR, AND ROTOR MANUFACTURING METHOD

(71) Applicant: Nidec Corporation, Kyoto (JP)

(72) Inventors: Takashi Shiraishi, Kyoto (JP); Takeshi Honda, Kyoto (JP); Junichi Uno, Kyoto (JP); Hisashi Fujihara, Kyoto (JP); Yasuaki Nakahara, Kyoto (JP); Keisuke Saito, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 145 days.

(21) Appl. No.: 16/461,019

(22) PCT Filed: Nov. 2, 2017

(86) PCT No.: PCT/JP2017/039718
§ 371 (c)(1),
(2) Date: May 15, 2019

(87) PCT Pub. No.: WO2018/100967
PCT Pub. Date: Jun. 7, 2018

(65) Prior Publication Data
US 2019/0319504 A1 Oct. 17, 2019

(30) Foreign Application Priority Data
Nov. 30, 2016 (JP) .............................. JP2016-233165

(51) Int. Cl.
*H02K 1/27* (2006.01)
*H02K 15/03* (2006.01)
*H02K 15/12* (2006.01)

(52) U.S. Cl.
CPC ........... *H02K 1/276* (2013.01); *H02K 1/2786* (2013.01); *H02K 15/03* (2013.01); *H02K 15/12* (2013.01)

(58) Field of Classification Search
CPC .................................. H02K 1/18; H02K 15/02
(Continued)

(56) References Cited

U.S. PATENT DOCUMENTS 5,786,650 A 7/1998 Uchida et al.
5,886,441 A 3/1999 Uchida et al.
(Continued)

FOREIGN PATENT DOCUMENTS

JP 03-36945 A 2/1991
JP 2013123365 A * 6/2013 ........... H02K 1/2773
(Continued)

OTHER PUBLICATIONS

Machine Translation JP2013198304A (Year: 2013).*
(Continued)

*Primary Examiner* — Jose A Gonzalez Quinones
(74) *Attorney, Agent, or Firm* — Keating & Bennett

(57) ABSTRACT

A rotor includes a rotor core including laminated thin plate cores. A single thin plate core includes an inner plate portion defining a portion of an inner core portion and outer plate portions defining a portion of an outer core portion. At least some of the laminated thin plate cores include a connecting portion. A number of connecting portion is one or a plurality, and, when the number of connecting portions is a plurality, the connecting portions at positions other than both left and right sides of each other in a circumferential direction, and, in plan view, the thin plate core includes the connecting portion at a position different from that of a connecting portion in another thin plate core adjacent in an axial direction.

11 Claims, 15 Drawing Sheets

(58) Field of Classification Search
USPC ..... 310/216.001, 216.004, 216.009, 216.011
See application file for complete search history.

(56) References Cited

U.S. PATENT DOCUMENTS

| | | |
|---|---|---|
| 5,889,346 A | 3/1999 | Uchida et al. |
| 5,939,810 A | 8/1999 | Uchida et al. |
| 2013/0119808 A1 | 5/2013 | Hirokawa et al. |
| 2014/0103772 A1* | 4/2014 | Kingrey ................ H02K 21/16 310/156.15 |
| 2015/0244218 A1 | 8/2015 | Kaufmann et al. |

FOREIGN PATENT DOCUMENTS

| | | | |
|---|---|---|---|
| JP | 2013-198304 A | | 9/2013 |
| JP | 2013198304 A | * | 9/2013 |
| JP | 2014-180094 A | | 9/2014 |
| WO | 2015/128782 A1 | | 9/2015 |

OTHER PUBLICATIONS

Machine Translation JP2013123365A (Year: 2013).*
Nakahara et al., "Rotor and Motor", U.S. Appl. No. 16/675,260, filed Nov. 6, 2019.
Shiraishi et al., "Rotor and Motor", U.S. Appl. No. 16/675,262, filed Nov. 6, 2019.
Official Communication issued in International Patent Application No. PCT/JP2017/039718, dated Jan. 23, 2018.

* cited by examiner

ROTOR, MOTOR, AND ROTOR MANUFACTURING METHOD

CROSS REFERENCE TO RELATED APPLICATIONS

This is the U.S. national stage of application No. PCT/JP2017/039718, filed on Nov. 2, 2017, and priority under 35 U.S.C. § 119(a) and 35 U.S.C. § 365(b) is claimed from Japanese Application No. 2016-233165, filed Nov. 30, 2016; the entire contents of which are incorporated herein by reference.

FIELD OF THE INVENTION

The present disclosure relates to a rotor, a motor, and a rotor manufacturing method.

BACKGROUND

Conventionally, a motor having a spoke type rotor is known.

The conventional rotor is an integrally laminated rotor which is composed of a plurality of thin plate cores integrally laminated. The integral thin plate core has an annular connecting part and a plurality of thin plate core piece parts. The plurality of thin plate core piece parts are arranged in a circumferential direction on an outer circumferential side of the annular connecting part. Each thin plate core piece part is connected through the annular connecting part and a support part. Each thin plate core piece part is disposed to be interposed in a predetermined position of a laminated structure of the plurality of thin plate core pieces and is connected to the thin plate core piece. A permanent magnet is disposed between thin plate core piece parts which are adjacent to each other.

SUMMARY

However, in the conventional rotor, in the integral thin plate core, all of the plurality of thin plate core piece parts are connected by the annular connecting part and the support part. Consequently, a magnetic flux flowing from a certain thin plate core piece part to the annular connecting part through the support part flows to thin plate core piece parts disposed at both left and right sides of the thin plate core piece part in a circumferential direction. That is, there is a problem in that, because a short circuit of the magnetic flux occurs, magnetic characteristics are degraded.

A rotor according to an example embodiment of the present disclosure includes a shaft extending along a central axis, a rotor core located radially outward of the shaft, fixed to the shaft directly or indirectly, and including a plurality of thin plate cores laminated, and a plurality of magnets fixed to the rotor core directly or indirectly, wherein the rotor core includes an inner core portion located radially inward of the magnet, a plurality of outer core portions located at positions adjacent to a circumferential side surface of the magnet, and a connecting portion to connect the inner core portion and the outer core portions, the plurality of outer core portions and the plurality of magnets are alternately arranged in a circumferential direction, the plurality of magnets are arranged in the circumferential direction so that circumferential end surfaces thereof, which are magnetic pole surfaces, face each other, a single thin plate core includes an inner plate portion defining a portion of the inner core portion and a plurality of outer plate portions defining a portion of the outer core portion, at least some of the plurality of laminated thin plate cores include the connecting portion, wherein the number of connecting portions is one or a plurality, and, when the number of connecting portions is a plurality, the connecting portions are disposed at positions other than both left and right sides of each other in the circumferential direction, and, in plan view, the thin plate core includes the connecting portion at a position different from that of a connecting portion in another thin plate core adjacent in an axial direction.

Also, a motor according to an example embodiment of the present disclosure, includes a rotor having the above-described configuration, a stator surrounding a radially outer side of the rotor, and a housing accommodating the rotor and the stator.

Also, a manufacturing method according to an example embodiment of the present disclosure, is a method of manufacturing a rotor having an inner core portion disposed along a central axis, a plurality of outer core portions disposed side by side in a circumferential direction at a radially outer side of the inner core portion, and a connecting portion to connect the inner core portion and the outer core portion, the rotor manufacturing method including a plate forming step of forming plates each including a scrap portion having a through-hole passing therethrough in an axial direction and a core plate portion disposed inside the through-hole so as to be continuous with the scrap portion and defining a portion of the inner core portion and the outer core portion, a laminating step of laminating the plates to form a laminated body including the inner core portion and the outer core portion, and a separating step of separating the scrap portion and the core plate portion, wherein, in at least some of the plates formed in the plate forming step, the core plate portion includes an inner plate portion defining a portion of the inner core portion and a plurality of outer plates defining a portion of the outer core portion, a number of connecting portions to connect the inner plate and the outer plate is one or a plurality, and, when the number of connecting portions is a plurality, the connecting portions are disposed at positions other than both left and right sides of each other in the circumferential direction, and, in the laminating step, the plates are laminated such that, in plan view, the core plates adjacent in an axial direction include the connecting portions at different positions.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. Here, in each drawing, a direction parallel to a central axis C1 illustrated in FIG. 1, which is a center of rotation of a rotor 1, is defined as a Z-axis direction, wherein an upper side thereof is denoted by Z1, and a lower side thereof is denoted by Z2. However, a vertical direction does not indicate the positional relationship and direction when incorporated into an actual device. Also, the direction parallel to the central axis C1 (Z-axis direction) is simply referred to as "axial direction," a radial direction around the central axis C1 is simply referred to as "radial direction," and a direction along an arc with the central axis C1 as the center, that is, a circumferential direction, is simply referred to as "circumferential direction."

Figure 1:
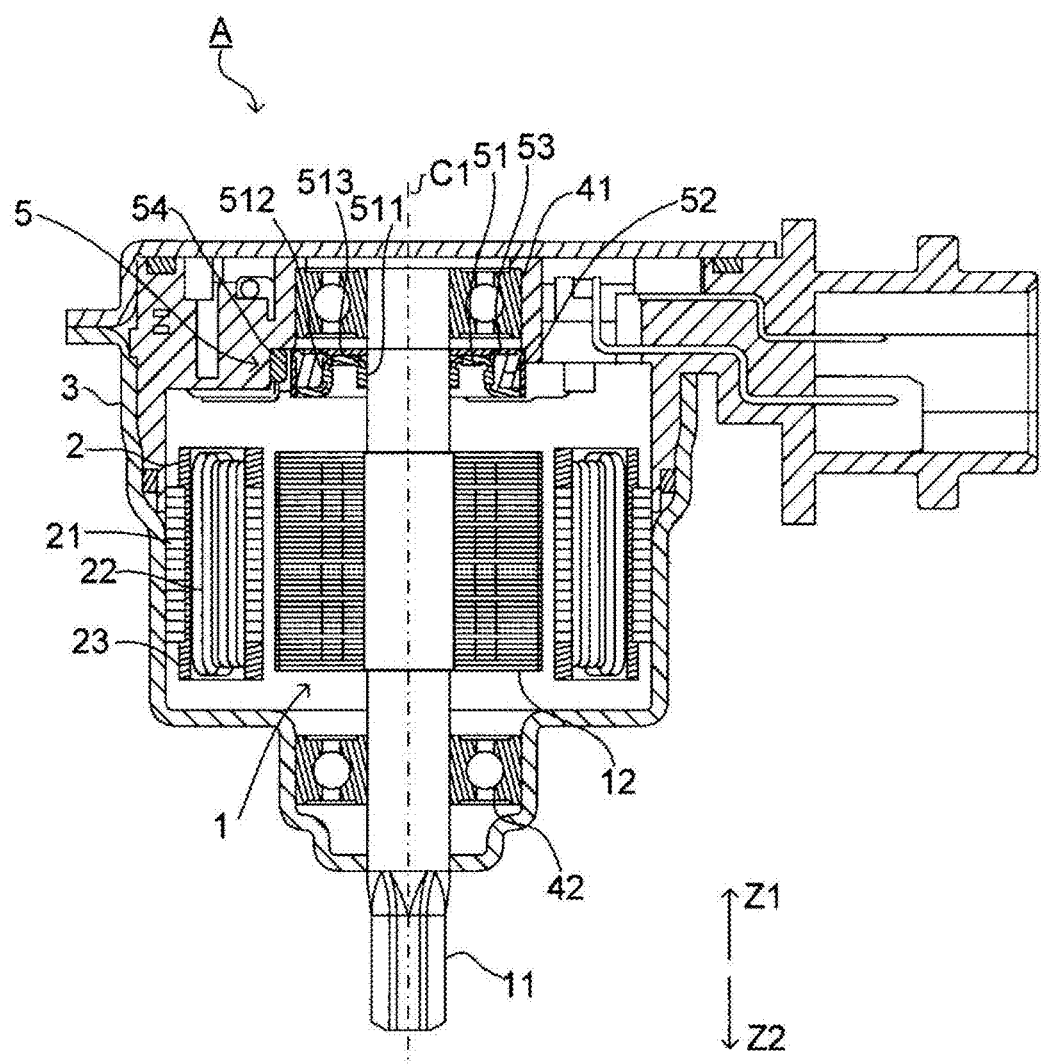
FIG. 1 is a cross-sectional view of a motor according to a first example embodiment of the present disclosure.

A schematic configuration of a motor according to a first example embodiment of the present disclosure will be described. FIG. 1 is a cross-sectional view of the motor.

A motor A illustrated in FIG. 1 has a rotor 1, a stator 2, a housing 3, a first bearing 41, and a second bearing 42. Also, the motor A has a sensor unit 5 detecting a rotational position of the rotor 1.

The housing 3 has a cylindrical shape extending in the axial direction and accommodates the rotor 1 and the stator 2 therein. The stator 2 is fixed to an inner circumferential surface of the housing 3. The stator 2 is fixed to the inside of the housing so that a central axis (central axis C1) of the stator 2 coincides with a central axis of the housing 3.

The stator 2 surrounds a radially outer side of the rotor 1. The stator 2 has a substantially annular shape when viewed from the top, and the central axis of the stator 2, which is an axis passing through the center of the substantially annular shape in the axial direction, coincides with the central axis C1. The stator 2 has a stator core 21, a coil 22, and an insulator 23. The stator 2 faces the rotor 1 and includes a plurality of coils 22.

The coil 22 is formed by winding a conductive wire around an outer circumference of the insulator 23 covering an outer surface of the stator core 21. An end part of the conductive wire is drawn out from the coil 22, and the end part of the conductive wire extends from an end part of one side in the axial direction of the stator 2 to the one side in the axial direction. By supplying power to the coil 22 through the conductive wire, the stator core 21 is excited. For example, the coils 22 of the motor A are divided into three phases (U, V, W). Then, a current having a sinusoidal waveform with a phase shifted is supplied to each phase. For that reason, the number of conductive wires provided is a number that allows the conductive wires to supply a current to each of the three phases. In the present example embodiment, there are two sets of three-phase conductive wires.

The rotor 1 has a shaft 11, a rotor core 12, and a magnet (not illustrated in FIG. 1). The shaft 11 has a columnar shape extending along the central axis C1. The shaft 11 is rotatably supported by the housing 3 while a first bearing 41 and a second bearing 42 are interposed therebetween. Consequently, the rotor 1 is rotatable about the central axis C1 with respect to the stator 2.

The rotor core 12 is located radially outward of the shaft 11 and is directly fixed to the shaft 11. Specifically, the shaft 11 is fixed to the rotor core 12 by press-fitting. Further, a fixing means is not limited to press-fitting, and, for example, the shaft 11 may also be fixed by adhesion using an adhesive. The configurations of the rotor core 12 and the magnet will be described in detail below.

Here, the first bearing 41 and the second bearing 42 are constituted by ball bearings. The first bearing 41 and the second bearing 42 are disposed above and below the shaft 11 respectively and rotatably support the shaft 11. Further, the bearings may also be constituted by, for example, sleeve bearings.

The sensor unit 5 has a sensor yoke 51, a sensor magnet 52, a sensor cover 53, and a rotation sensor 54. The sensor yoke 51 is a substantially cylindrical member. The sensor yoke 51 is made of a magnetic material. The sensor yoke 51 has a cylindrical inner wall part 511, a cylindrical outer wall part 512, and a top plate part 513. In the present example embodiment, the inner wall part 511 and the outer wall part 512 have a cylindrical shape. An inner surface of the inner wall part 511 of the sensor yoke 51 is fixed to an outer circumferential surface of the shaft 11. Consequently, the sensor yoke 51 is fixed to the shaft 11.

The outer wall part 512 is located radially outside the inner wall part 511 and surrounds the inner wall part 511 in the circumferential direction. That is, the sensor yoke 51 has a double cylindrical shape. The top plate part 513 has an annular shape connecting an upper end part of the inner wall part 511 and an upper end part of the outer wall part 512.

The sensor magnet 52 has an annular shape. The sensor magnet 52 is held by the sensor yoke 51. For example, the sensor magnet 52 is fitted to the outer wall part 512 from a radially outer side. Consequently, the sensor magnet 52 is indirectly fixed to the shaft 11 through the sensor yoke 51. Further, the sensor magnet 52 may also be directly fixed to the shaft 11.

The rotation sensor 54 faces the sensor magnet 52 in the radial direction via a gap. The rotation sensor 54 is, for example, a Hall integrated circuit (IC) and is provided in plural. The rotation sensor 54 detects a change in a magnetic flux of the sensor magnet 52. On the basis of the detected change in the magnetic flux, the rotational position of the rotor 1 is calculated by a control device or the like (not illustrated) controlling the motor A. Further, the rotation sensor 54 may also face the sensor magnet 52 in the axial direction via a gap. Further, although a sensor using a hall IC is used as the rotation sensor 54 in the present example embodiment, the rotation sensor 54 is not limited thereto.

For example, a sensor capable of detecting rotation of a rotor, such as a resolver, may be widely adopted as the rotation sensor 54.

Figure 2:
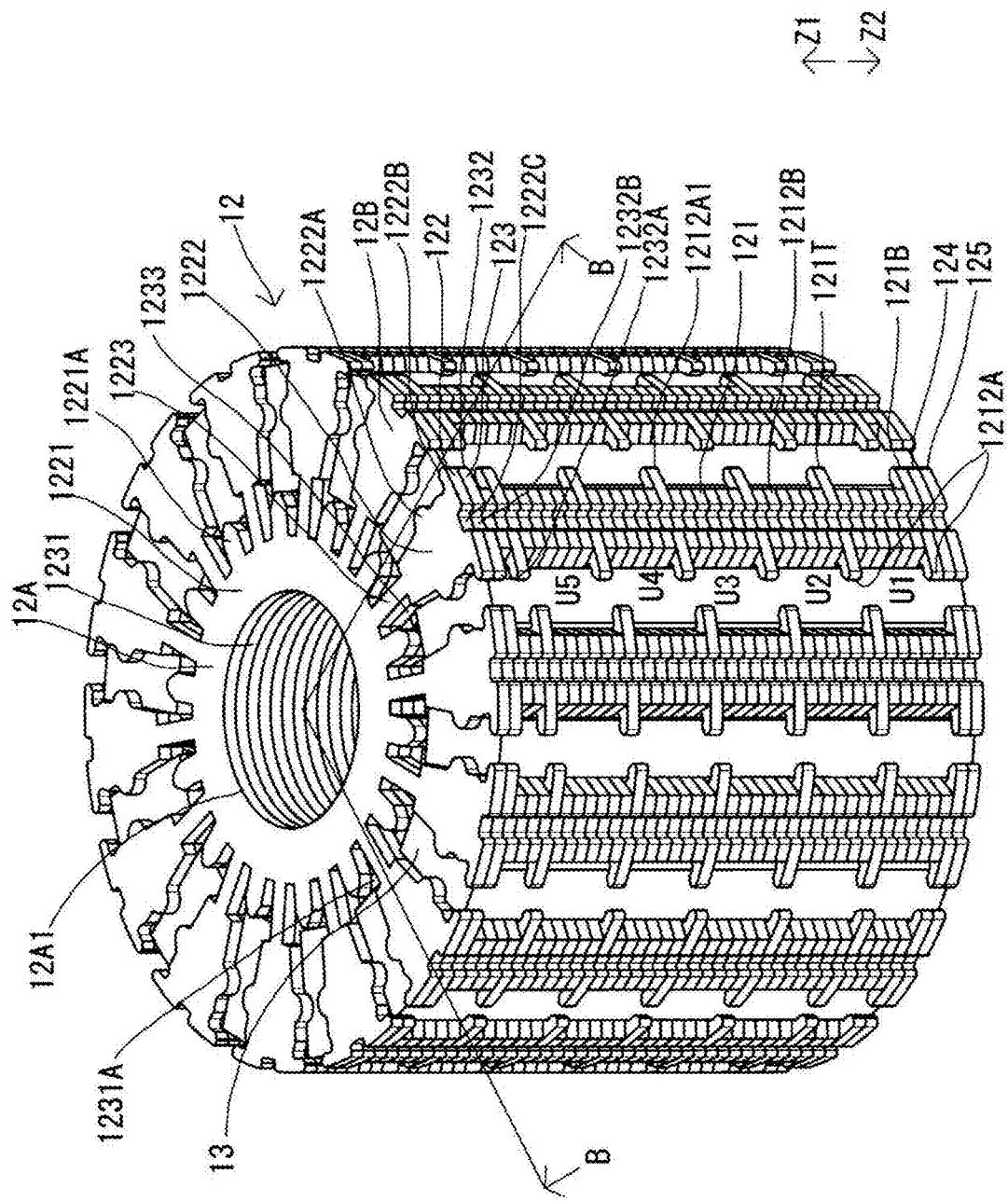
FIG. 2 is a perspective view illustrating, among configurations included in a rotor according to the first example embodiment of the present disclosure, configurations of a rotor core and a magnet.
Figure 3:
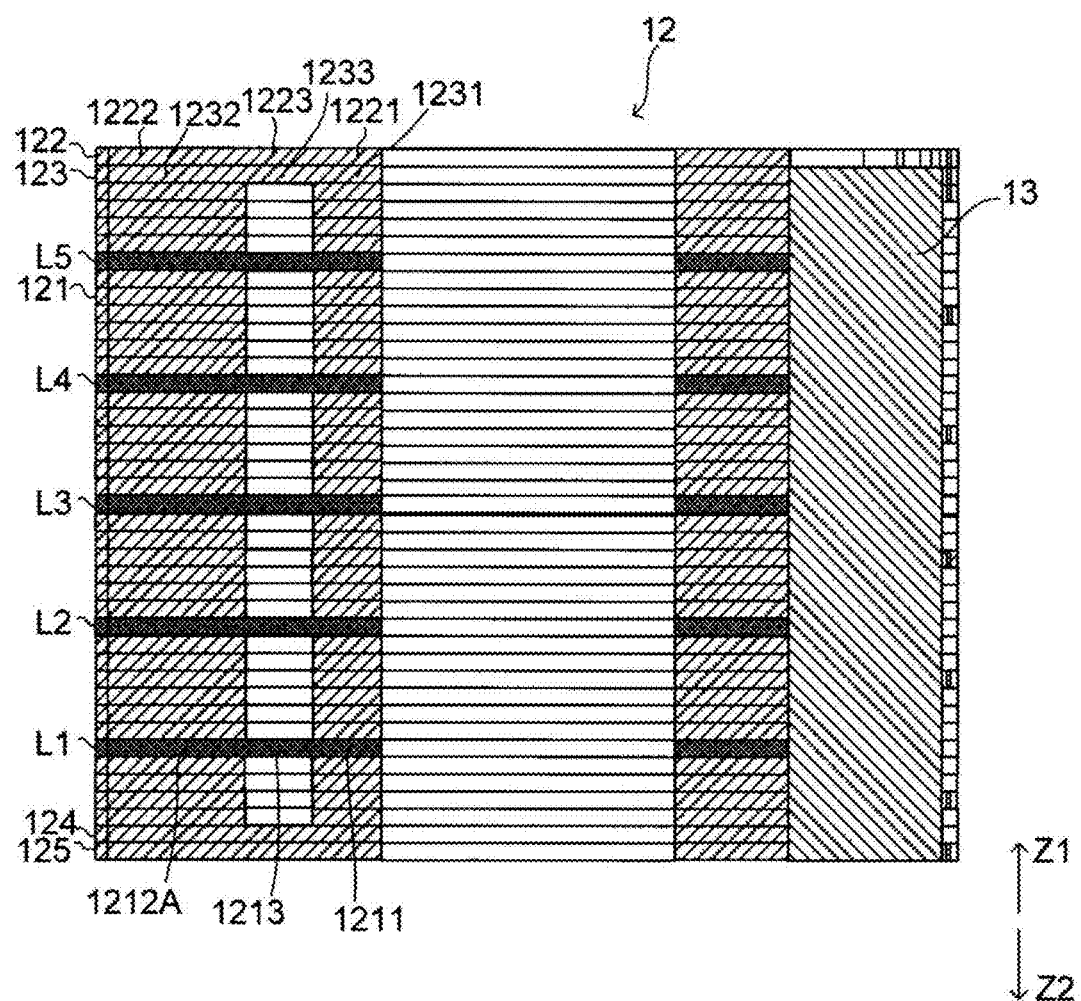
FIG. 3 is a cross-sectional view taken along line B-B in FIG. 2.

Next, the configurations of the rotor core 12 and the magnet according to the present example embodiment will be described in detail. FIG. 2 is a perspective view illustrating, among the configurations included in the rotor 1, the configurations of the rotor core 12 and a magnet 13. Also, FIG. 3 is a cross-sectional view taken along line B-B in FIG. 2. That is, the left side of FIG. 3 illustrates a cross-section taken vertically at a central position in a circumferential direction of an outer core part 12B (which will be described below) of the rotor core 12, and the right side of FIG. 3 illustrates a cross-section taken vertically at a central position in the circumferential direction of the magnet 13.

The rotor core 12 is formed by laminating a plurality of first thin plate cores 121, a second thin plate core 122, a third thin plate core 123, a fourth thin plate core 124, and a fifth thin plate core 125. The second thin plate core 122 is disposed at an axially upper end of the rotor core 12, and the third thin plate core 123 is disposed adjacent to an axially lower side of the second thin plate core 122. The fifth thin plate core 125 is disposed at an axially lower end of the rotor core 12, and the fourth thin plate core 124 is disposed adjacent to an axially upper side of the fifth thin plate core 125. The plurality of first thin plate cores 121 are laminated between the third thin plate core 123 and the fourth thin plate core 124 in the axial direction.

As illustrated in FIG. 2, the second thin plate core 122 has a substantially annular inner plate part 1221, a plurality of outer plate parts 1222, and a plurality of connecting parts 1223. The plurality of outer plate parts 1222 are arranged at intervals in the circumferential direction at a radially outer side of the inner plate part 1221. The connecting parts 1223 connect each outer plate part 1222 to the inner plate part 1221. The inner plate part 1221 has a plurality of protrusions 1221A. Each protrusion 1221A is disposed between the connecting parts 1223 adjacent in the circumferential direction and protrudes radially outward.

The outer plate part 1222 has a shape that expands in the circumferential direction radially outward. The outer plate part 1222 has two facing parts 1222A that protrude in the circumferential direction from both circumferential side surfaces. At a radially outer end part, the outer plate part 1222 has two claw parts 1222B that protrude to both circumferential sides in the middle of the outer plate part 1222 in the radial direction. Also, at the radially outer end part, the outer plate part 1222 has a connecting concave part 1222C that is concave radially inward.

As illustrated in FIG. 2, the third thin plate core 123 has a substantially annular inner plate part 1231, a plurality of outer plate parts 1232, and a plurality of connecting parts 1233. The plurality of outer plate parts 1232 are arranged at intervals in the circumferential direction at a radially outer side of the inner plate part 1231. The connecting parts 1233 connect each outer plate part 1232 to the inner plate part 1231. The inner plate part 1231 has a plurality of protrusions 1231A. Each protrusion 1231A is disposed between the connecting parts 1233 adjacent in the circumferential direction and protrudes radially outward.

The outer plate part 1232 has the same configuration as the outer plate part 1222 of the second thin plate core 122 except for not having the facing part, and has two claw parts 1232A. At a radially outer end part, the outer plate part 1232 has a connecting concave part 1232B that is concave radially inward.

Also, the fourth thin plate core 124 and the fifth thin plate core 125 have the same configurations as the second thin plate core 122 and the third thin plate core 123, respectively, and each of the fourth thin plate core 124 and the fifth thin plate core 125 has a substantially annular inner plate part, a plurality of outer plate parts, and a plurality of connecting parts. The fourth thin plate core 124 and the fifth thin plate core 125 also have a protrusion. Also, the outer plate parts of the fourth thin plate core 124 and the fifth thin plate core 125 do not have the facing part. The outer plate parts of the fourth thin plate core 124 and the fifth thin plate core 125 have a claw part and a connecting concave part.

Figure 4:
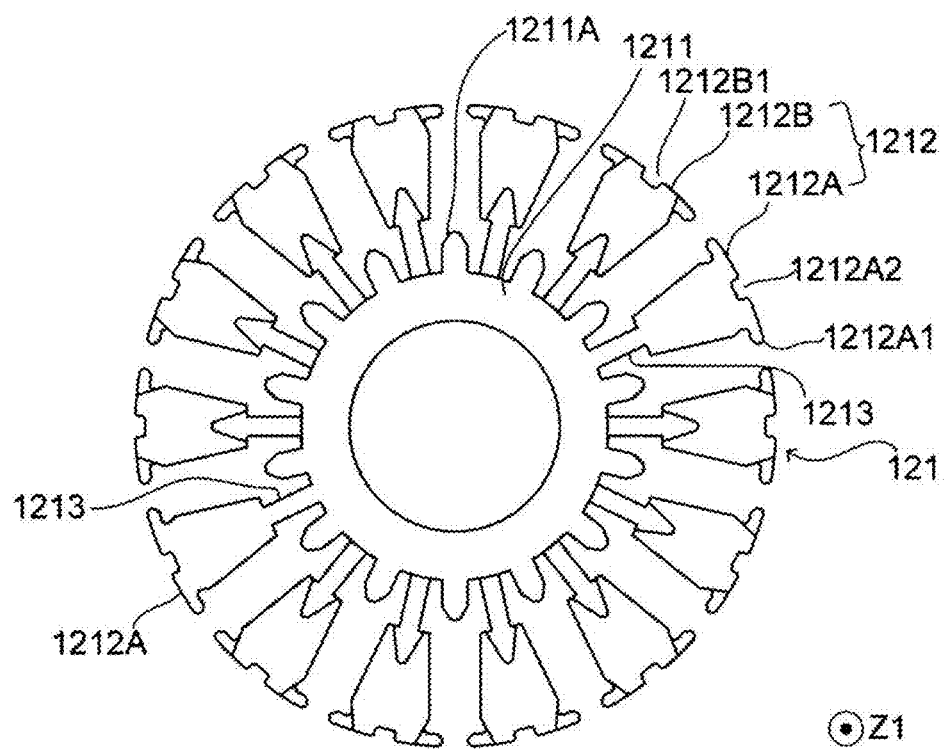
FIG. 4 is a plan view of a state in which the rotor core illustrated in FIG. 2 is cut by a plane, which is orthogonal to an axial direction, right above a certain first thin plate core as viewed from the top.

Here, FIG. 4 is a plan view of a state in which the rotor core 12 illustrated in FIG. 2 is cut by a plane, which is orthogonal to the axial direction, right above a certain first thin plate core 121 as viewed from the top. As illustrated in FIG. 4, a single first thin plate core 121 has a substantially annular inner plate part 1211, a plurality of outer plate parts 1212, and a plurality of connecting parts 1213.

At a radially outer side of the inner plate part 1211, the plurality of outer plate parts 1212 are arranged at intervals in the circumferential direction. In the present example embodiment, fourteen outer plate parts 1212 are provided. Among the fourteen outer plate parts 1212, two first outer plate parts 1212A are connected to the inner plate part 1211 by the connecting part 1213. The remaining second outer plate parts 1212B are not connected to the inner plate part 1211. Further, in FIG. 4, a portion indicated between the second outer plate part 1212B and the inner plate part 1211 is a connecting part of a different thin plate core located at an axially lower side.

The first outer plate parts 1212A are disposed to be point-symmetrical, that is, rotationally symmetrical, about the central axis C1. The first outer plate part 1212A has a shape that expands in the circumferential direction radially outward and, at a radially outer end part, has two claw parts 1212A1 protruding to both circumferential sides. Also, at the radially outer end part, the first outer plate part 1212A has a connecting concave part 1212A2 that is concave radially inward.

The second outer plate part 1212B has a shape that expands in the circumferential direction radially outward, and a corner part at a radially outer side is chamfered. The second outer plate part 1212B does not have a claw part like the first outer plate part 1212A. Further, in FIG. 4, portions protruding from a radially outer end part of the second outer plate part 1212B to both circumferential sides are claw parts of another thin plate core located at an axially lower side. Also, at the radially outer end part, the second outer plate part 1212B has a connecting concave part 1212B1 that is concave radially inward.

Also, the inner plate part 1211 has a plurality of protrusions 1211A protruding radially outward. Each protrusion 1211A is disposed radially inward between the outer plate parts 1212 which are adjacent in the circumferential direction.

An inner core part 12A is comprised by laminating the inner plate part 1221 of the second thin plate core 122, the inner plate part 1231 of the third thin plate core 123, the inner plate parts 1211 of the plurality of first thin plate cores 121, the inner plate part of the fourth thin plate core 124, and the inner plate part of the fifth thin plate core in the axial direction (FIG. 2). As will be described below, the laminated inner plate parts are connected by, for example, caulking. The inner core part 12A has a through-hole 12A1 passing therethrough in the axial direction radially inward. The shaft 11 is passed through the through-hole 12A1, and the shaft 11 is fixed to the rotor core 12 by, for example, press-fitting.

An outer core part 12B is comprised by laminating the outer plate part 1222 of the second thin plate core 122, the outer plate part 1232 of the third thin plate core 123, the outer plate parts 1212 of the plurality of first thin plate cores 121, the outer plate part of the fourth thin plate core 124, and the outer plate part of the fifth thin plate core in the axial direction. As will be described below, the laminated outer plate parts are connected by, for example, caulking. Because fourteen outer plate parts are provided in each thin plate core, fourteen outer core parts 12B are formed. At a radially outer side of the inner core part 12A, the outer core parts 12B are arranged at intervals in the circumferential direction.

A plurality of magnets 13 have a rectangular parallelepiped shape extending in the axial direction. The magnet 13 is inserted between the outer core parts 12B, which are adjacent in the circumferential direction, and fixed to the rotor core 12. The outer core part 12B is located at a position adjacent to a circumferential side surface of the magnet 13. The outer core part 12B and the magnet 13 are alternately arranged in the circumferential direction. The magnet 13 has two magnetic poles disposed in the circumferential direction. In the magnets 13 adjacent to each other in the circumferential direction, the same poles face each other in the circumferential direction. Consequently, the outer core part 12B disposed between the magnets whose N poles face each other is excited to the N pole. Conversely, the outer core part 12B disposed between the magnets 13 whose S poles face each other is excited to the S pole.

Here, a laminated configuration by the plurality of first thin plate cores 121 will be described. As illustrated in FIG. 4, in a single first thin plate core 121, two connecting parts 1213 are provided at rotationally symmetrical positions. One connecting part 1213 is disposed at a position other than both left and right sides of the other connecting part 1213 in the circumferential direction.

Figure 5:
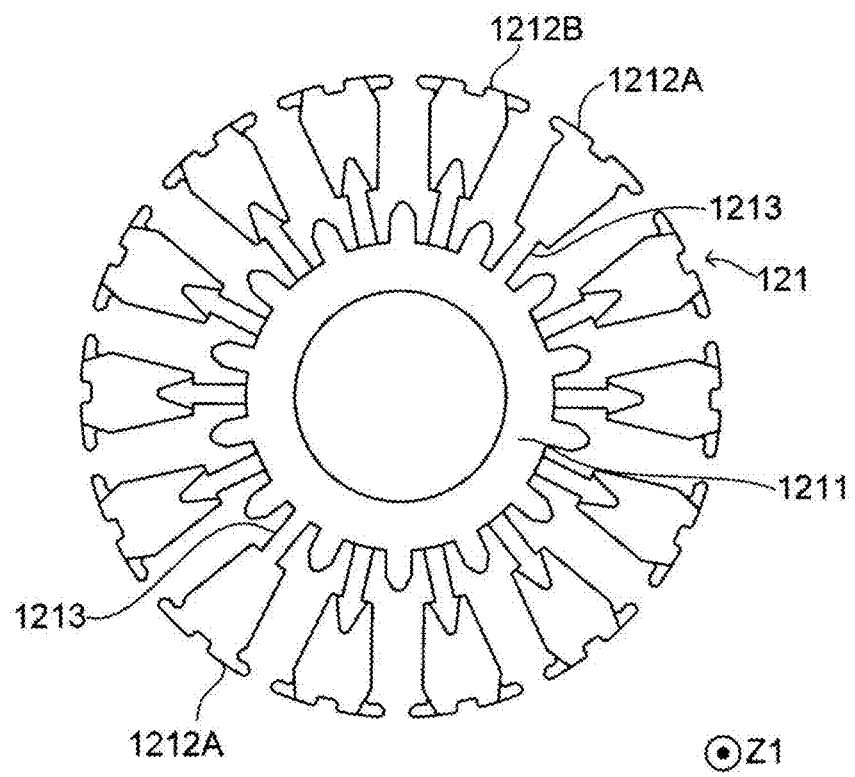
FIG. 5 is a plan view of a first thin plate core adjacent to an axially upper side of the first thin plate core illustrated in FIG. 4 as viewed from the top.
Figure 6:
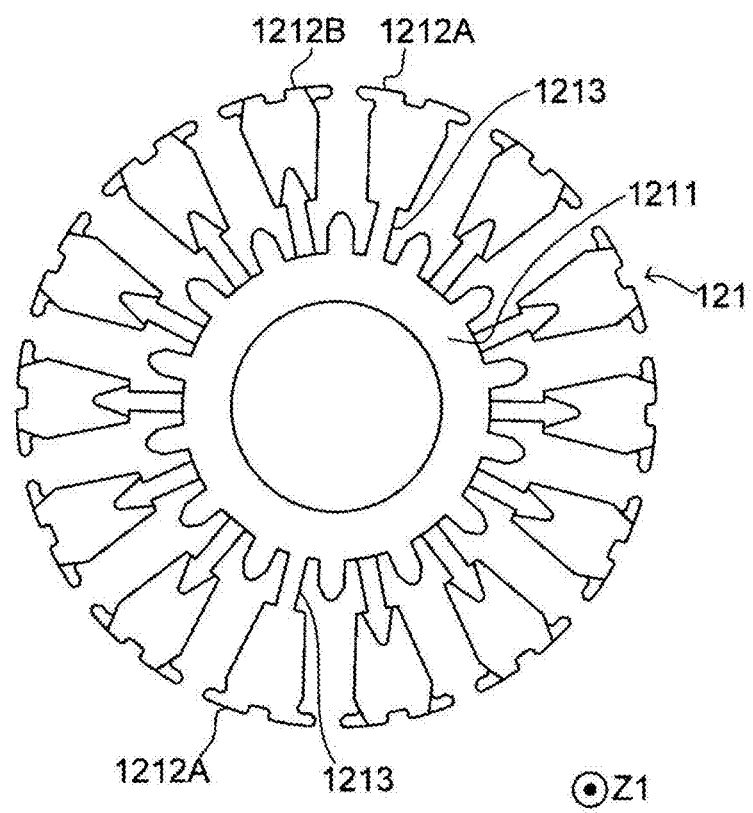
FIG. 6 is a plan view of a first thin plate core adjacent to an axially upper side of the first thin plate core illustrated in FIG. 5 as viewed from the top.

FIG. 5 is a plan view of a first thin plate core 121 adjacent to an axially upper side of the first thin plate core 121 illustrated in FIG. 4 as viewed from the top. As illustrated in FIG. 5, as compared with FIG. 4, in plan view, the connecting part 1213 and the first outer plate part 1212A are disposed at positions shifted by being rotated counterclockwise by as much as a single outer plate part. Moreover, FIG. 6 is a plan view of a first thin plate core 121 adjacent to an axially upper side of the first thin plate core 121 illustrated in FIG. 5 as viewed from the top. As illustrated in FIG. 6, as compared with FIG. 5, in plan view, the connecting part 1213 and the first outer plate part 1212A are disposed at positions shifted by being rotated counterclockwise by as much as a single outer plate part.

In FIG. 2, for example, the first thin plate core 121 adjacent to an axially upper side of the fourth thin plate core located below the rotor core 12 is a bottom thin plate core 121B. Each time a first thin plate core 121 is more adjacent to the axially upper side than to the bottom thin plate core 121B, as described above, in plan view, the connecting part 1213 and the first outer plate part 1212A are disposed at positions shifted by being rotated counterclockwise by as much as a single outer plate part. In this way, the first thin plate cores 121 are sequentially laminated axially upward, and, in plan view, positions of a connecting part 1213 and a first outer plate part 1212A in a certain first thin plate core 121 coincide with positions of the connecting part 1213 and the first outer plate part 1212A of the bottom thin plate core 121B. As illustrated in FIG. 2, such a first thin plate core 121 is a top thin plate core 121T.

In this way, the first thin plate cores 121 are laminated so that the connecting parts 1213 and the first outer plate parts 1212A are spirally disposed from the bottom thin plate core 121B to the top thin plate core 121T. A thin plate core unit U1 is comprised by the laminated first thin plate cores 121.

Then, with the top thin plate core 121T as a new bottom thin plate core 121B, again, the first thin plate cores 121 are laminated up to a top thin plate core 121T in the same manner as described above. By this lamination, another thin plate core unit U2 is comprised adjacent to the axially upper side of the preceding thin plate core unit U1.

In the rotor core 12 illustrated in FIG. 2, by repeating such a configuration of the thin plate core unit axially upward, a total of five thin plate core units U1 to U5 are comprised. Then, by the above-described rotational arrangement, a single first thin plate core 121 is laminated adjacent to an axially upper side of a top thin plate core 121T included in the top thin plate core unit U5. The third thin plate core 123 is disposed adjacent to the axially upper side of the laminated first thin plate core 121. Further, by such lamination of the first thin plate cores 121, in FIG. 3, the layers indicated by hatching that are indicated by L1 to L5 represent the first thin plate cores 121 in which cross-sections of the connecting parts 1213 and the first outer plate parts 1212A thereof taken along line B-B are visible. Further, the present example embodiment is not limited to all of the plurality of thin plate core units being laminated in the same manner. For example, in a plurality of thin plate core units, due the lamination being ended in the middle thereof, a thin plate core unit, in which the number of laminated thin plate cores is smaller than that of other thin plate core units, may also be included.

In this way, the rotor 1 according to the present example embodiment includes the shaft 11 extending along the central axis, the rotor core 12 located radially outward of the shaft 11, directly fixed to the shaft 11, and comprised by laminating the plurality of thin plate cores 121 to 125, and the plurality of magnets 13 directly fixed to the rotor core 12.

The rotor core 12 includes the inner core part 12A located radially inward of the magnets 13, the plurality of outer core parts 12B located at positions adjacent to circumferential side surfaces of the magnets 13, and the connecting parts (1223, 1233, 1213 or the like) connecting the inner core part 12A and the outer core parts 12B.

The plurality of outer core parts 12B and the plurality of magnets 13 are alternately arranged in the circumferential direction, and the plurality of magnets 13 are arranged in the circumferential direction so that circumferential end surfaces thereof, which are magnetic pole surfaces, face each other.

A single thin plate core (121 or the like) has the inner plate part (1211 or the like) constituting a part of the inner core part 12A and the plurality of outer plate parts (1212 or the like) constituting a part of the outer core part 12B.

At least some thin plate cores 121 of the plurality of laminated thin plate cores have the connecting part 1213, wherein the number of connecting parts 1213 is a plurality, the connecting parts 1213 are disposed at positions other than both left and right sides of each other in the circumferential direction, and, in plan view, the thin plate cores 121 have the connecting parts 1213 at positions different from those of connecting parts 1213 in other thin plate cores 121 adjacent in the axial direction. Further, in the present example embodiment, the at least some of the thin plate cores 121 are all of the laminated first thin plate cores 121, excluding the second thin plate core 122 to the fifth thin plate core 125.

According to such a configuration, in a single thin plate core 121, a magnetic flux flowing from a certain outer plate part 1212A to the inner plate part 1211 through the connecting part 1213 does not flow to the outer plate parts 1212B at both left and right sides in the circumferential direction. For that reason, a magnetic flux that is short-circuited decreases, and a magnetic flux that contributes to torque increases. Also, because the connecting parts 1213 are not disposed adjacent to each other in the axial direction, it is possible to avoid formation of a large magnetic flux path connecting the outer core part 12B and the inner core part 12A. That is, according to the rotor 1 of the present example embodiment, it is possible to improve magnetic characteristics.

Also, in the thin plate core 121, because the outer plate part 1212B not connected to the inner plate part 1211 is connected to the inner core part 12A through the connecting parts 1213 disposed at different positions in the axial direction, it is possible to transmit a rotational force to the inner core part 12A and also to the shaft 11. Particularly, the magnets 13 can be held by the connecting parts 1213 even without providing a resin part for holding the magnets like the rotor core 12 in the present example embodiment, thereby leading to a reduction in member cost.

Further, in the laminated configuration of the thin plate cores in the rotor core, for example, in several thin plate cores, the outer plate parts located at both left and right sides in the circumferential direction of the outer plate part connected to the inner plate part by the connecting part may be connected to the inner plate part by the connecting part. Also, for example, in several thin plate cores, in plan view, positions of connecting parts may coincide with those in other thin plate cores that are adjacent in the axial direction. Also, the several thin plate cores may not have a connecting part.

Also, the number of connecting parts of the first thin plate core 121 is not limited to a plurality, and may also be one.

Also, in the present example embodiment, the thin plate cores 122 and 125 disposed on at least one of the axially upper end and the axially lower end of the rotor core 12 have the plurality of connecting parts (1223 or the like) connecting the inner plate part (1221 or the like) and all of the outer plate parts (1222 or the like).

According to such a configuration, by avoiding a state in which an end part of the outer core part 12B reaches a cantilever state, it is possible to improve a strength of the outer core part 12B. Further, the thin plate core only disposed on one of the axially upper end and the axially lower end of the rotor core may be comprised as described above.

Also, in the present example embodiment, the facing part 1222A is provided on the outer plate part 1222 of the second thin plate core 122 disposed at the axially upper end, and a facing part is not provided on outer plate parts of thin plate cores other than the second thin plate core 122 in the rotor core 12. Consequently, it is possible to insert the magnet 13 between the outer core parts 12B adjacent in the circumferential direction from below. At this time, for example, the magnet 13 is fixed to the rotor core 12 by a spring member that applies a force upward from a lower surface by an elastic force. Further, the magnet 13 may also be fixed to the rotor core 12 by, for example, adhesion using an adhesive.

In this way, the outer plate part 1222 included in the thin plate core 122 disposed at the axially upper end of the rotor core 12 has the facing part 1222A facing the magnet 13 on the axially lower end. Consequently, it is possible to suppress the magnet 13 from falling off in the axial direction.

Also, the number of connecting parts 1213 in the first thin plate core 121 is not limited to two, and may also be three or more. For example, when the number of connecting parts 1213 is three, the connecting parts 1213 are disposed at equal intervals, each of which is 120°, in the circumferential direction. That is, the number of connecting parts 1213 included in the at least some of the thin plate cores 121 is at least two, and the connecting parts 1213 are disposed to be rotationally symmetrical. Consequently, it is possible to improve the rotational balance of the rotor core 12.

Also, in at least a portion of the at least some of the thin plate cores 121, the thin plate cores 121 are laminated axially upward from the bottom until the positions of the connecting parts 1213 included in the thin plate cores 121B and 121T located at the top and bottom coincide in plan view while the positions of the connecting parts 1213 included in the thin plate cores 121 adjacent to the axially upper side are regularly shifted in a predetermined direction in the circumferential direction in plan view. Further, the regular shifting of the connecting parts 1213 is not limited to occurring by as much as a single connecting part and may also occur by as much as two or more connecting parts. Also, a direction in which the connecting parts 1213 are shifted may be clockwise when viewed from the top.

According to such a configuration, it is possible to improve the rotational balance of the rotor core 12. Also, it is possible to improve the assemblability and strength of the rotor core 12.

Also, in the above-described configuration, with the thin plate core 121T, which is located at the top, as the bottom, the thin plate cores 121 are laminated again while the connecting parts 1213 are regularly shifted in the same direction as the predetermined direction in plan view.

Further, a direction in which the connecting parts 1213 are shifted in a thin plate core unit U adjacent to an axially upper side of another thin plate core unit U may be opposite to a direction in which the connecting parts 1213 are shifted in the thin plate core unit U at the lower side.

Also, in the present example embodiment, the claw parts (1222B, 1232A, 1212A1 or the like) protruding in the circumferential direction are disposed at the radially outer side of the outer core part 12B. Consequently, it is possible to suppress radially outward scattering of the magnets 13 by the claw parts even without providing the resin part for holding the magnets.

In the above-described configuration, the claw parts (1222B, 1232A, 1212A1 or the like) are located at radially outer sides of the outer plate parts (1222, 1232, 1212A or the like) connected by the connecting parts (1223, 1233, 1213 or the like). Consequently, it is possible to improve the strength of the rotor core 12 in response to the suppression of the scattering of the magnets 13.

Also, in the above-described configuration, a claw part is not provided at the outer plate part 1212B not connected by the connecting part 1213. By not providing the claw part at the outer plate part which does not contribute to the suppression of the scattering of the magnets 13 in terms of strength, it is possible to suppress the influence of degradation of magnetic characteristics.

Also, in the present example embodiment, the claw part 1212A1 is provided at the first outer plate part 1212A of the first thin plate core 121, and, as the first thin plate core 121 moves axially upward by as much as a single layer, the position of the first outer plate part 1212A is shifted in plan view. That is, the position of the claw part 1212A1 is regularly shifted in the predetermined direction in the circumferential direction in plan view as the thin plate core 121 moves upward by as much as a single layer. Consequently, it is possible to suppress the influence of degradation of magnetic characteristics by the claw part.

Figure 7:
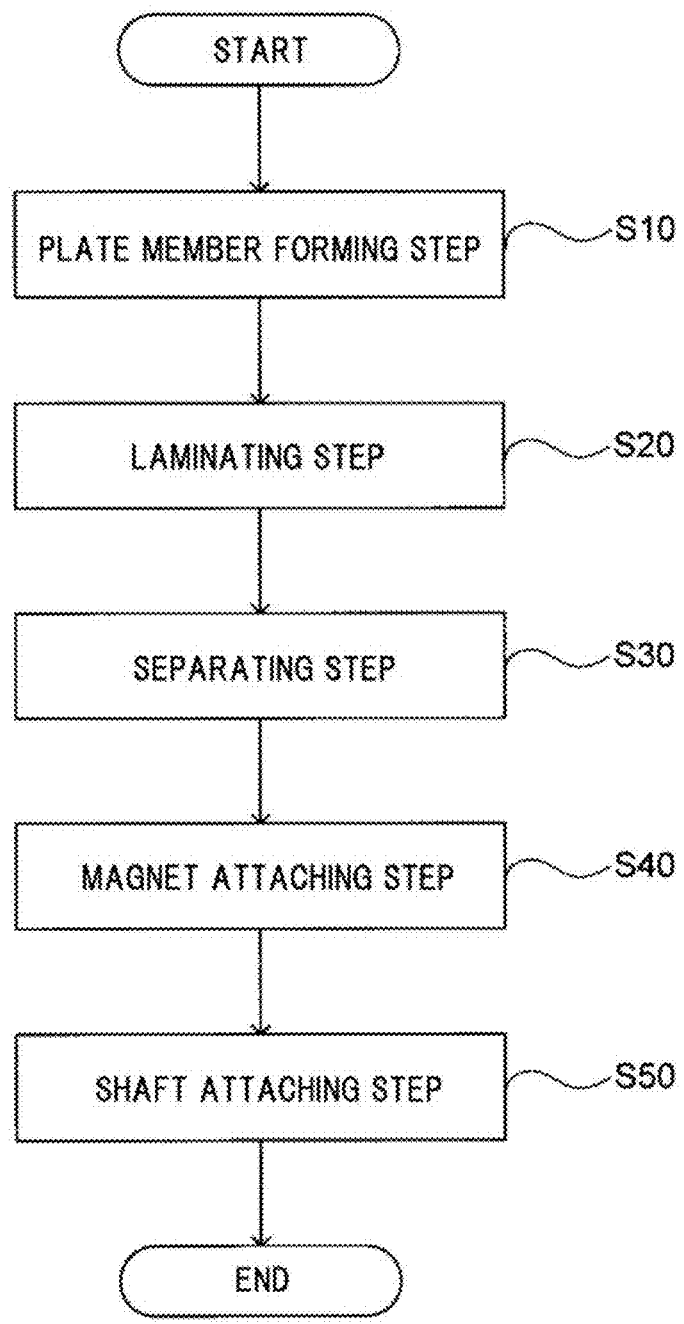
FIG. 7 is a flowchart of a method of manufacturing the rotor according to the first example embodiment of the present disclosure.

A method of manufacturing the above-described rotor 1 according to the present example embodiment will be described. FIG. 7 is a flowchart of a method of manufacturing the rotor 1 according to the present example embodiment.

As illustrated in FIG. 7, the method of manufacturing the rotor 1 according to the present example embodiment has a plate member forming step S10, a laminating step 20, a separating step S30, a magnet attaching step S40, and a shaft attaching step S50. Further, in the method of manufacturing the rotor 1 of the present example embodiment, the plate member forming step S10 to the separating step S30 are manufacturing steps of the rotor core 12.

Figure 8:
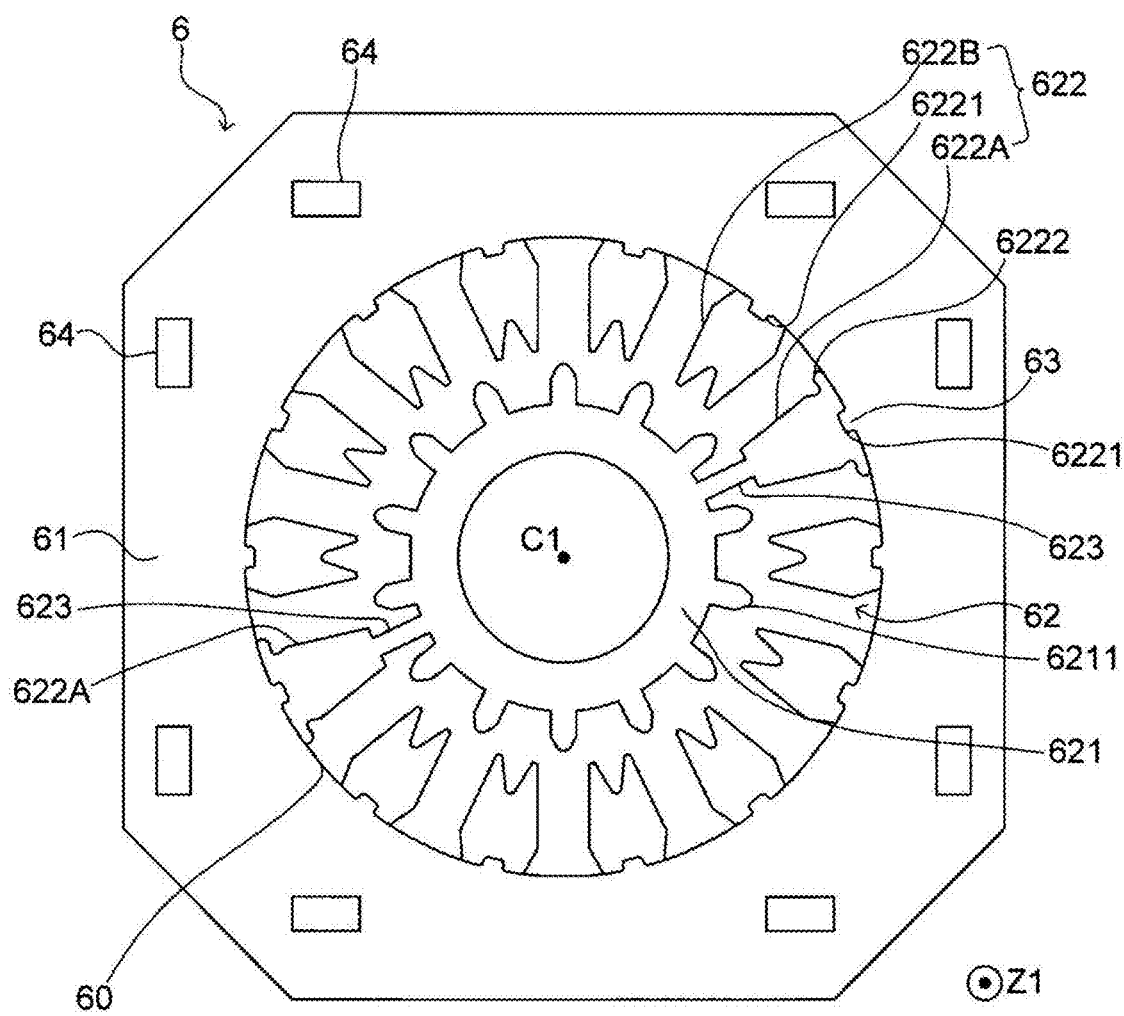
FIG. 8 is a plan view illustrating an example of a plate member.

The plate member forming step S10 is a step of forming a plate member 6 illustrated in FIG. 8 or the like. FIG. 8 is a plan view illustrating an example of the plate member 6. The plate member 6 is a plate-shaped member. The shape of the plate member 6 is substantially square in plan view. In plan view, four corners of the plate member 6 are chamfered. The plate member 6 has a scrap part 61 and a core plate part 62. The scrap part 61 has a substantially annular shape having a center hole 60 passing therethrough in the axial direction.

The scrap part 61 has a plurality of connecting convex parts 63 and a plurality of fixing parts 64. The scrap part 61 is an annular portion defining the center hole 60. The connecting convex parts 63 protrude radially inward from an inner edge of the center hole 60 and are arranged at equal intervals in the circumferential direction. The shape of the connecting convex part 63 is substantially rectangular in plan view. The shape of the connecting convex part 63 follows the shape of a connecting concave part 6221 of the core plate part 62.

The core plate part 62 is disposed so as to be continuous with the scrap part 61 at the radially inner side of the scrap part 61. The core plate part 62 illustrated in FIG. 8 corresponds to the first thin plate core 121 of the rotor core 12 which has been manufactured. The core plate part 62 has an inner plate part 621, a plurality of outer plate parts 622, and a connecting part 623. The outer plate parts 622 include two first outer plate parts 622A and a plurality of second outer plate parts 622B. The outer plate parts 622 are arranged at equal intervals along the inner edge of the center hole 60 and have the connecting concave part 6221 that is concave radially inward at the radially outer end part.

The two first outer plate parts 622A are disposed to be rotationally symmetrical, and each of the two first outer plate parts 622A are connected to the inner plate part 621 by the connecting part 623. The first outer plate part 622 has a claw part 6222 protruding to both circumferential sides at the radially outer end part. The second outer plate part 622B is not connected to the inner plate part 621 and does not have a claw part. Also, the inner plate part 621 has a plurality of protrusions 6211 protruding radially outward.

The core plate part 62 is connected to the scrap part 61 by the connecting concave part 6221 of the outer plate part 622 being fitted to the connecting convex part 63. Further, the connecting concave part may have a portion where a dimension in the circumferential direction becomes larger radially inward of the radially outer end. Consequently, the connecting concave part fitted to the connecting convex part can be suppressed from moving in the radial direction. That is, the core plate part 62 can be suppressed from moving in the radial direction and being separated from the scrap part 61.

A plurality of (eight in FIG. 8) fixing parts 64 are disposed in the scrap part 61. It is desirable that each fixing part 64 be disposed to be point-symmetrical about the central axis C1. The shape of the fixing part 64 is rectangular in plan view. The fixing part 64 has a shape extruded to one side in the axial direction. When the scrap part 61 is overlapped, the fixing parts 64 overlap in the axial direction. The scrap part 61 is fixed in the axial direction by an extruded portion of the fixing part 64 being fitted into another fixing part 64. That is, the scrap part overlapped in the axial direction is fixed by a caulking treatment using the fixing part 64.

In the plate member forming step S10, the plate member 6 in which the core plate part 62 is fitted to the scrap part 61 is formed. In the plate member forming step S10, first, a disk part 71 (see FIG. 10) and a through-hole 72 (see FIG. 9) are formed by punching a belt-shaped electromagnetic steel plate 7. The shape of the disk part 71 illustrated in FIG. 10 is substantially circular in plan view. The disk part 71 has a plurality of connecting concave parts 6221 at an outer edge. The plurality of connecting concave parts 6221 are disposed at equal intervals in the circumferential direction at the outer edge of the disk part 71.

Figure 9:
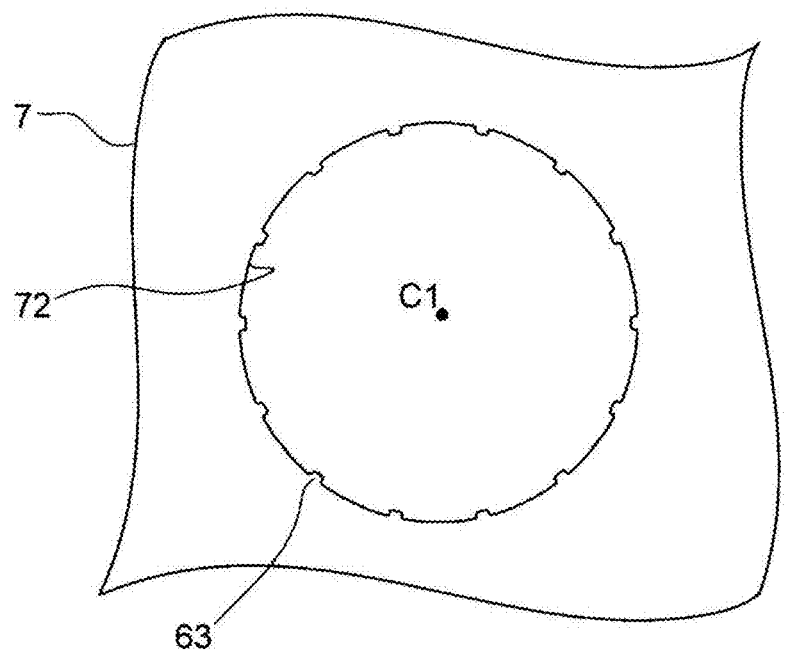
FIG. 9 is a plan view illustrating a portion of a plate member forming step.
Figure 10:
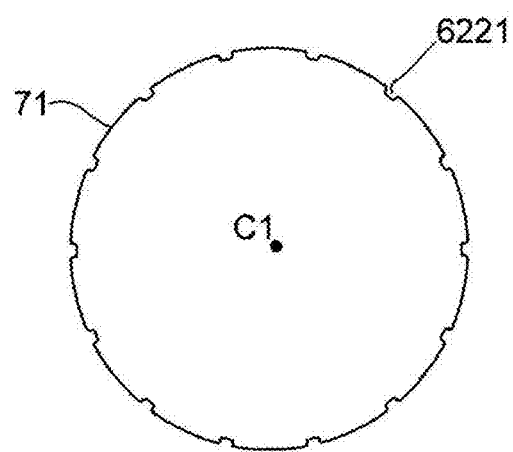
FIG. 10 is a plan view illustrating a portion of the plate member forming step.

The through-hole 72 illustrated in FIG. 9 is formed by punching the disk part 71 from the electromagnetic steel plate 7. The through-hole 72 has a plurality of connecting convex parts 63 extending radially inward from an inner edge. The plurality of connecting convex parts 63 are disposed at equal intervals in the circumferential direction at the inner edge of the through-hole 72. The connecting convex parts 63 are formed along the connecting concave parts 6221 by punching the electromagnetic steel plate 7.

Next, the disk part 71 is fitted to the through-hole 72. As described above, the plurality of connecting convex parts 63 are formed along the connecting concave parts 6221 respectively corresponding thereto. For that reason, by fitting the disk part 71 to the through-hole 72, the plurality of connecting convex parts 63 and the plurality of connecting concave parts 6221 can be fitted together.

An outer diameter of the core plate part 62 is formed by punching a portion of the electromagnetic steel plate 7 in a state in which the disk part 71 is fitted to the through-hole 72. Specifically, from the disk part 71, a portion other than the portion which becomes the outer shape of the core plate part 62 is punched out and separated. The core plate part 62 and the center hole 60 are formed by this punching process. The core plate part 62 is formed in a state of being connected to the scrap part 61.

Then, a portion of the electromagnetic steel plate 7 is extruded in the axial direction by being press-machined at a radial outer side of the center hole 60 of the electromagnetic steel plate 7 in order to form the fixing part 64. An area in which the fixing part 64 is formed is an area which becomes the scrap part 61 of the electromagnetic steel plate 7. After the fixing part 64 is formed, the electromagnetic steel plate 7 is punched out along the outer shape of the plate member 6 illustrated in FIG. 8. Consequently, the formation of the plate member 6 is completed.

Figure 11:
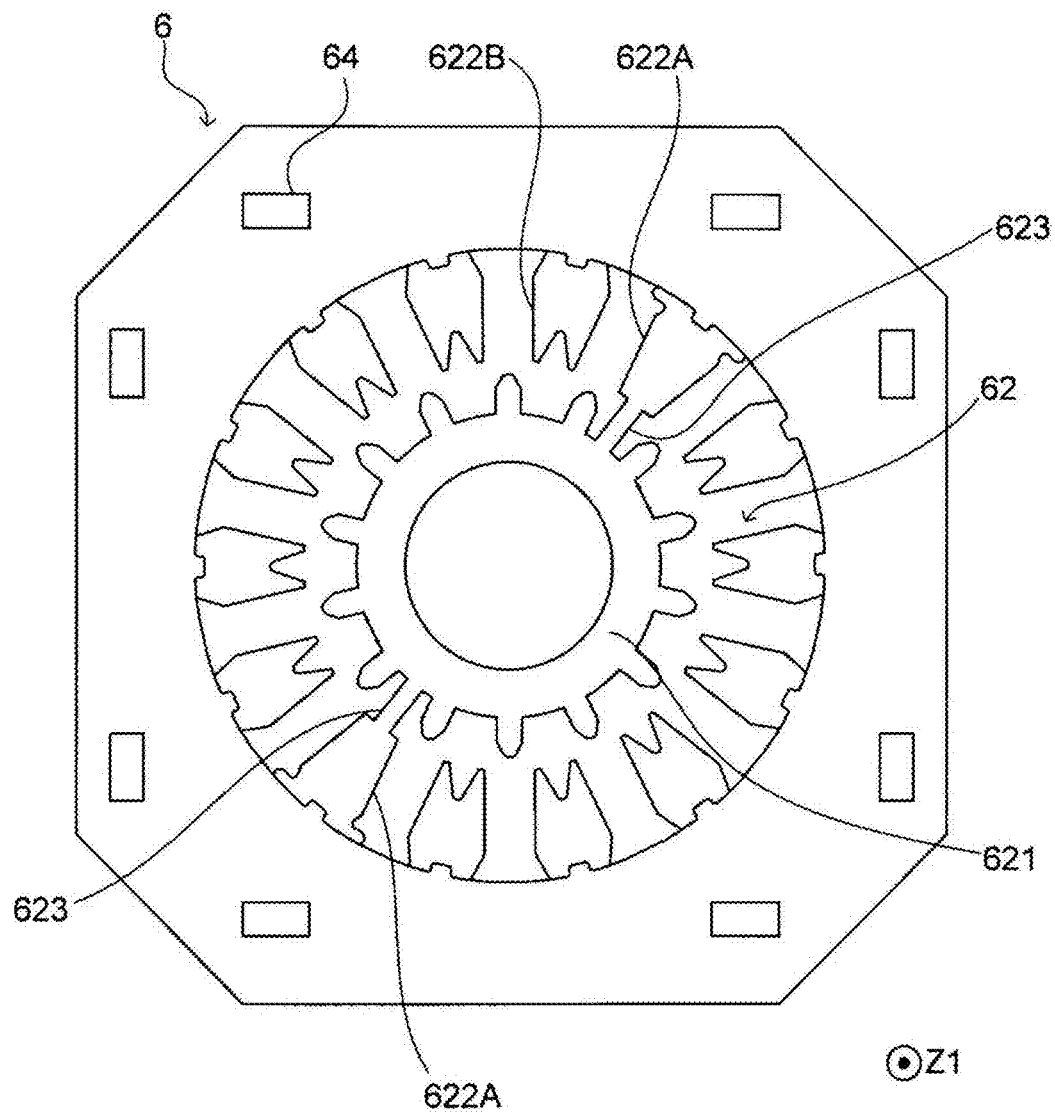
FIG. 11 is a plan view illustrating an example of a plate member.
Figure 12:
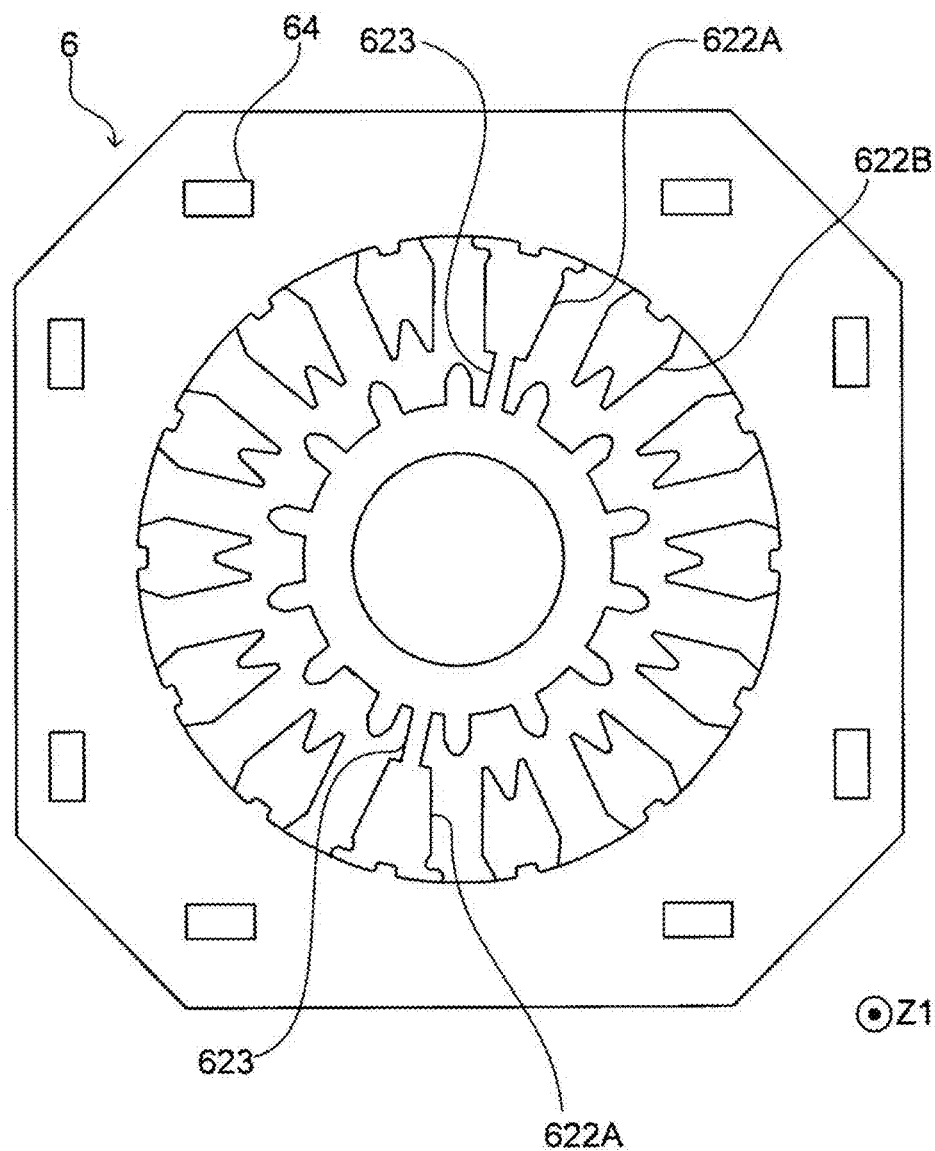
FIG. 12 is a plan view illustrating an example of a plate member.

Further, in the plate member forming step S10, for example, after the plate member 6 illustrated in FIG. 8 is formed, a plate member 6 illustrated in FIG. 11 is formed using the same method as the above-described forming method. As compared with the plate member 6 illustrated in FIG. 8, the plate member 6 illustrated in FIG. 11 is formed in a shape in which the core plate part 62 is rotated with respect to the scrap part 61 such that the first outer plate part 622A and the connecting part 623 are formed to be shifted counterclockwise by as much as a single outer plate part in plan view. Moreover, after that, the plate member 6 illustrated in FIG. 12 is formed in the same manner. As compared with the plate member 6 illustrated in FIG. 11, the plate member 6 illustrated in FIG. 12 is formed in a shape in which the core plate part 62 is rotated with respect to the scrap part 61 such that the first outer plate part 622A and the connecting part 623 are formed to be shifted counterclockwise by as much as a single outer plate part in plan view. The core plate part 62 of the plate member 6 illustrated in FIGS. 11 and 12 corresponds to the first thin plate core 121. Subsequently, the plate member 6 is formed in the same manner.

In this way, by sequentially forming the plate members 6, it is possible to laminate the plate members 6 without rotating the plate members 6 in the laminating step S20 which will be described below. Therefore, it is possible to simplify the laminating step S20.

Also, in the plate member forming step S10, in addition to the formation of the plate member 6 including the core plate part 62 corresponding to the first thin plate core 121, plate members including core plate parts each corresponding to the second thin plate core 122, the third thin plate core 123, the fourth thin plate core 124, and the fifth thin plate core 125 are also formed. The forming method at this time is the same as the above-described method of forming the plate member 6 including the core plate part 62 corresponding to the first thin plate core 121.

The laminating step S20 is a step of forming a laminated body by laminating the plate members formed in the plate member forming step S10. In the laminating step S20, the plate members are sequentially laminated toward one side in the axial direction. Specifically, the plate member including the core plate part corresponding to the fifth thin plate core 125, the plate member including the core plate part corresponding to the fourth thin plate core 124, the plurality of plate members 6 each including the core plate part 62 corresponding to the first thin plate core 121, the plate member including the core plate part corresponding to the third thin plate core 123, and the plate member including the core plate part corresponding to the second thin plate core 122 are laminated in that order. When laminating the plate members 6 each including the core plate part 62 corresponding to the first thin plate core 121, each time the plate member 6 is laminated, the core plate part 62 is disposed to be shifted to a rotated position.

Also, the extruded portion of the fixed part of the plate member to be laminated is fitted to a recessed portion of the fixed part of the already-laminated plate member. Consequently, the plate members overlapping in the axial direction are fixed to each other.

Also, in the plate member including the core plate part corresponding to the fifth thin plate core 125 to be laminated first, a concave part or a through-hole is formed by extrusion in each outer plate part included in the core plate part. Then, next, when laminating the plate member including the core plate part corresponding to the fourth thin plate core 124, a concave part is formed by extrusion in each outer plate part included in the core plate part, and the concave part is fitted to the concave part or the through-hole of the already-laminated plate member. After that, each time the plate member is laminated, a concave part to be fitted to the concave part formed in the outer plate part of the previously-laminated plate member is formed in the outer plate part. Consequently, the outer plate parts laminated in the axial direction are fixed by a caulking treatment. Further, the inner plate part laminated in the axial direction is also fixed by the caulking treatment by the same method. At this time, a place where the concave part is provided in the inner plate part is, for example, a place where the concave part overlaps with each outer plate part in the radial direction. In this case, the concave parts are arranged at equal intervals in the circumferential direction in the inner plate part.

Also, in the present example embodiment, the plate members formed in the plate member forming step S10 drop to the other side in the axial direction without change and are sequentially laminated. That is, the plate member forming step S10 and the laminating step S20 are proceeded in parallel. Consequently, it is possible to form the laminated body efficiently. Further, the laminating step S20 may also be performed after all of the plate members constituting the laminated body are formed by the plate member forming step S10.

By laminating the plate members, the core plate parts are laminated. Consequently, the inner core part 12A and the outer core part 12B are formed. That is, in the laminating step S20, the laminated body, which includes the inner core part 12A and the outer core part 12B, is formed by laminating the plate members.

The separating step S30 is a step of separating a scrap part from the laminated body formed by the laminating step S20. Here, the fitting between the connecting convex part and the connecting concave part is released to separate the scrap part and the core plate part. For that reason, it is easy to separate the scrap part and the core plate part.

Specifically, the laminated body is set in a pressing machine. Then, along a boundary between the scrap part and the core plate part, the rotor core 12 including the inner core part 12A and the outer core part 12B is punched from the laminated body by the pressing machine. Even when the scrap part is removed in the separating step S30, the outer plate parts laminated in the axial direction and the inner plate parts are fixed to each other, and, because the outer core part 12B and the inner core part 12A are connected by each connecting part, the shape of the rotor core 12 is maintained.

In the magnet attaching step S40, in the rotor core 12, the magnet 13 is inserted between the outer core parts 12B, which are adjacent in the circumferential direction, from a lower side in the axial direction. The inserted magnet 13 is fixed to the rotor core 12 by, for example, applying an elastic force from a lower surface thereof by a spring member (not illustrated). At this time, an upper surface of the magnet 13 comes into contact with the facing part 1222A formed on the outer plate part 1222 of the second thin plate core 122, and the magnet 13 is positioned in the axial direction. Further, in the rotor core 12, the magnet 13 is positioned in the radial direction by a columnar protrusion formed by lamination of the protrusions (1221A, 1231A, 1211A or the like). Further, the inserted magnet 13 may also be fixed by adhesion using an adhesive.

In the shaft attaching step S50, the shaft 11 is fixed to the inner core part 12A of the rotor core 12 to which the magnet 13 is fixed. For example, the shaft 11 is fixed by press-fitting an outer circumferential surface of the shaft 11 to an inner circumferential surface of the inner core part 12A. Further, a fixing means is not limited to press-fitting, and, for example, the shaft 11 may also be fixed by adhesion using an adhesive.

In this way, the present example embodiment is a method of manufacturing the rotor 1 having the inner core part 12A disposed along the central axis C1, the plurality of outer core parts 12B disposed side by side in the circumferential direction at a radially outer side of the inner core part 12A, and the connecting parts (1223, 1233, 1213 or the like) connecting the inner core part 12A and the outer core parts 12B.

Then, the method of manufacturing the rotor 1 has the plate member forming step S10 of forming the plate members (6 or the like) each having the scrap part (61 or the like) having the through-hole (60 or the like) passing therethrough in the axial direction and the core plate part (62 or the like) disposed so as to be continuous with the scrap part and constituting a part of the inner core part 12A and the outer core part 12B, the laminating step S20 of forming the laminated body having the inner core part 12A and the outer core part 12B by laminating the plate members, and the separating step S30 of separating the scrap part and the core plate part.

Then, in at least some plate members 6 formed in the plate member forming step S10, the core plate part 62 has the inner plate part 621 constituting a part of the inner core part 12A and the plurality of outer plate parts 622 constituting a part of the outer core part 12B, the number of connecting parts 623 connecting the inner plate part 621 and the outer plate part 622 is a plurality, and the connecting parts 623 are disposed at positions other than both left and right sides of each other in the circumferential direction.

Then, in the laminating step S20, the plate members 6 are laminated such that, in plan view, the core plate parts 62 adjacent in the axial direction have the connecting parts 623 at different positions.

According to such a configuration, as described above, the rotor 1 with excellent magnetic characteristics can be manufactured. Also, even in the case of the outer plate part 622 that is not connected to the inner plate part 621, because the outer plate part 622 is connected to the scrap part at the time of laminating, it is easy to manufacture the rotor core 12.

Next, as a modified example of the above-described first example embodiment, the second example embodiment will be described. In the present example embodiment, a rotor has a resin part.

Figure 13:
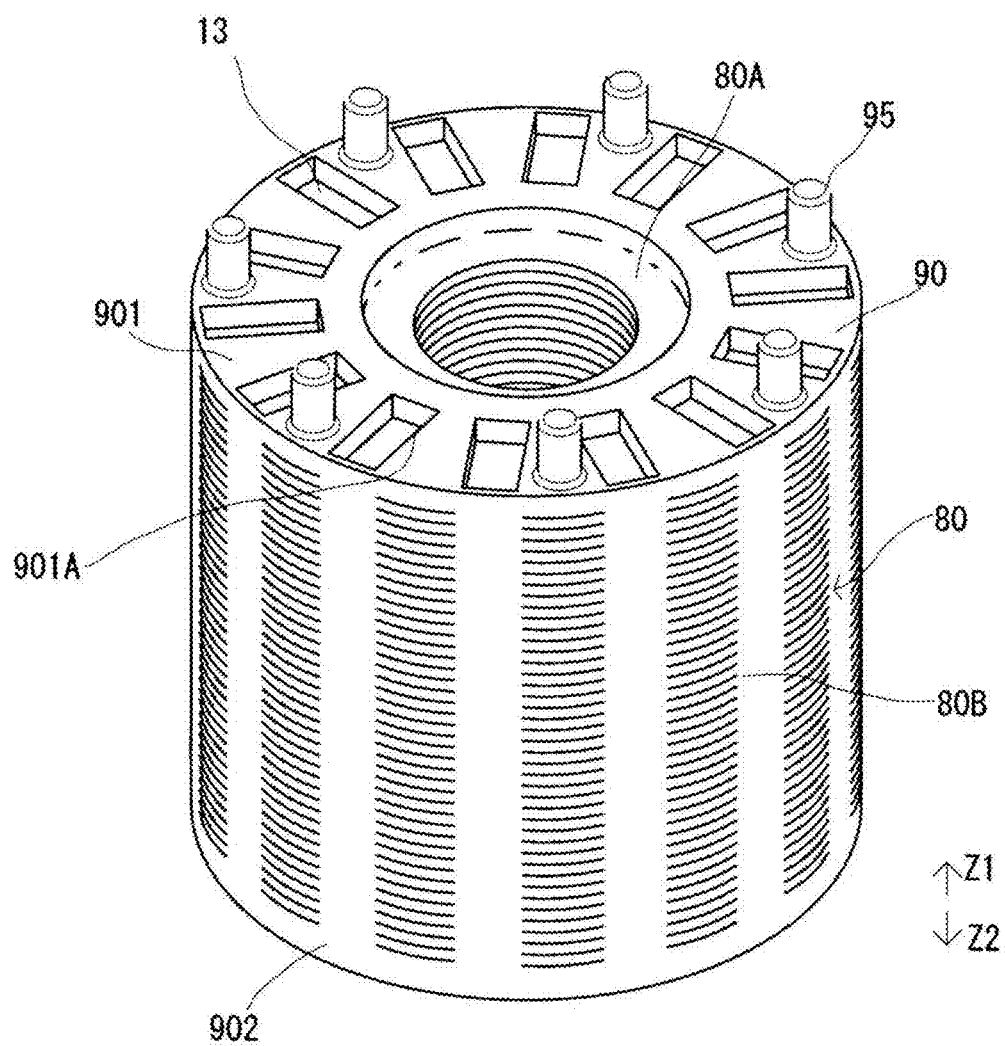
FIG. 13 is a perspective view illustrating configurations of a rotor core and a resin portion of a rotor according to a second example embodiment of the present disclosure.

FIG. 13 is a perspective view illustrating configurations of a rotor core 80 and a resin part 90 of the rotor according to the second example embodiment of the present disclosure. The rotor core 80 according to the present example embodiment has a configuration obtained by modifying the rotor core 12 according to the first example embodiment illustrated in FIG. 2. The rotor core 80 has an inner core part 80A comprised by laminating inner plate parts and a plurality of outer core parts 80B comprised by laminating outer plate parts.

Specifically, in the rotor core 80, a claw part is not provided at the outer plate part of each thin plate core. In the present example embodiment, because the magnet 13 is held by the resin part 90 to suppress scattering of the magnet 13 radially outward, it is not necessary to provide a claw part. Consequently, it is possible to suppress degradation of magnetic characteristics of the rotor core 80.

Also, in the thin plate core disposed at an axially upper end of the rotor core 80, a facing part is not provided. Also, in the rotor core 80, a protrusion is not provided at the inner plate part of each thin plate core.

The resin part 90 is comprised by molding by pouring a filling material (resin material) using a mold, which will be described below, and is fixed to the rotor core 80. The resin part 90 has a lid part 901 at an axially upper end part. The lid part 901 is formed in an annular shape from a position overlapping a radially outer end part of an outer core part 80B in the axial direction to a position on an axially upper end surface of an inner core part 80A.

The resin part 90 has a lid part 902, which is the same as the lid part 901, at an axially lower end part. Also, the resin part 90 is formed in contact with an outer circumferential surface of the inner core part 80A and a circumferential side surface of each outer core part 80B. That is, at least a portion of the resin part 90 is located between the outer core parts 80B in the circumferential direction. Also, the resin part 90 has a magnet housing part 901A passing therethrough in the axial direction from the lid part 901 to the lid part 902, between the outer core parts 80B adjacent in the circumferential direction. Therefore, a plurality of magnets 901 are arranged in the circumferential direction.

The magnet 13 is inserted and fixed to the magnet housing part 901A. The fixing of the magnet 13 is performed by, for example, press-fitting or adhesion using an adhesive. That is, in the present example embodiment, the magnet 13 is indirectly fixed to the rotor core 80 through the resin part 90.

Also, in the present example embodiment, the shaft 11 is inserted and fixed to the inner core part 80A. The fixing of the shaft 11 is performed by, for example, press-fitting or adhesion using an adhesive. Further, it is also possible to form the resin part in contact with an inner circumferential surface of the inner core part 80A. In that case, the shaft 11 is fixed to a through-hole formed in the resin part. That is, the shaft may also be indirectly fixed to the rotor core through the resin part.

In this way, in the present example embodiment, the resin part 90 is fixed to the rotor core 80, and the resin part 90 comes in contact with the magnet 13. Consequently, even in the case in which the resin part 90 is deformed by centrifugal force, heat, or the like, because the inner core part 80A and the outer core part 80B are connected by the connecting part, it is possible to suppress a change in the outer shape of the rotor.

Further, as illustrated in FIG. 13, a plurality of pins 95 protruding axially upward are fixed to the lid part 901. Each pin 95 is disposed between magnet housing parts 901A adjacent in the circumferential direction. An end plate (not illustrated) is fixed to the pin 95. Specifically, a plurality of holes are formed in the end plate, the pin 95 is fitted into the hole, and the end plate is fixed by welding or the like between the pin 95 and the end plate. It is possible to suppress scattering of the magnet 13 in the axial direction by the end plate.

Also, in addition to forming the resin part by molding as described above, a resin case to which the magnet 13 is fixed in advance by press-fitting or the like may be inserted and fixed between the adjacent outer core parts 80B of the rotor core 80.

Figure 14:
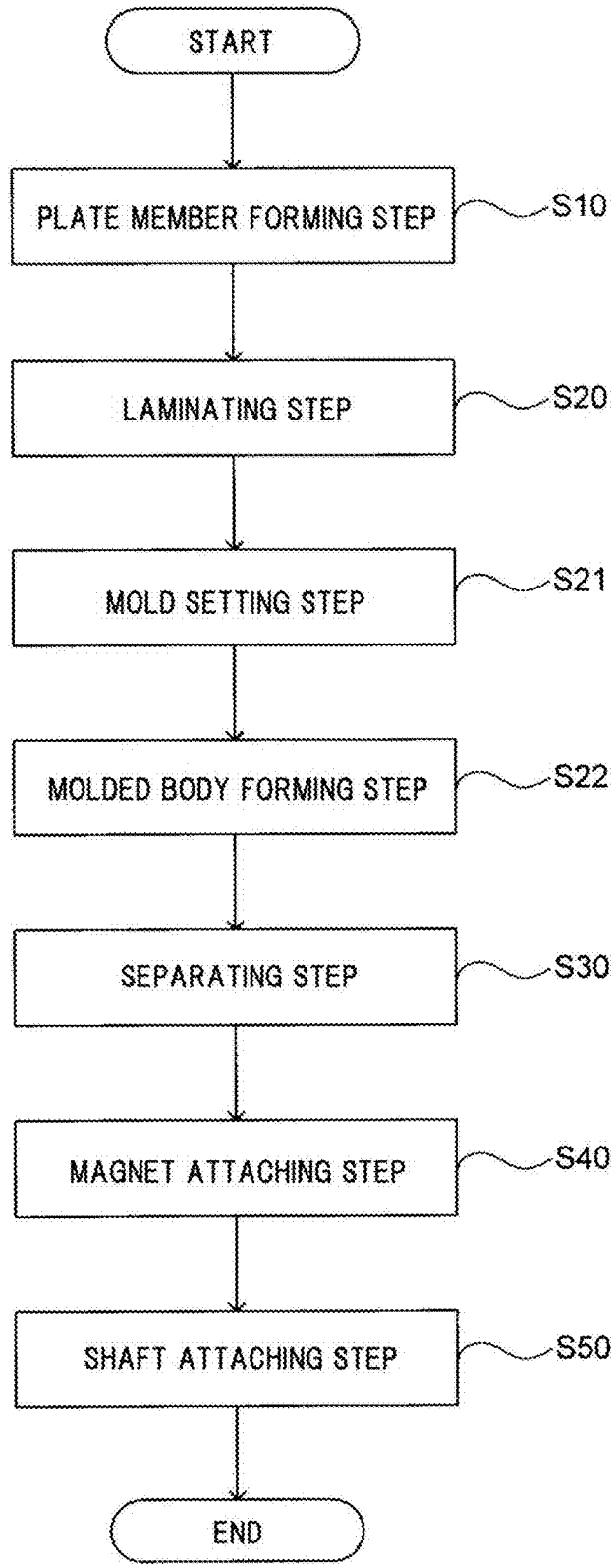
FIG. 14 is a flowchart of a method of manufacturing the rotor according to the second example embodiment of the present disclosure.

Next, a method of manufacturing the rotor according to the present example embodiment will be described. FIG. 14 is a flowchart of a method of manufacturing the rotor according to the present example embodiment. The process illustrated in FIG. 14 is different from the process illustrated in FIG. 7 according to the above-described first example embodiment in that, between the laminating step S20 and the separating step S30, a mold setting step S21 and a molded body forming step S22 are added.

Figure 15:
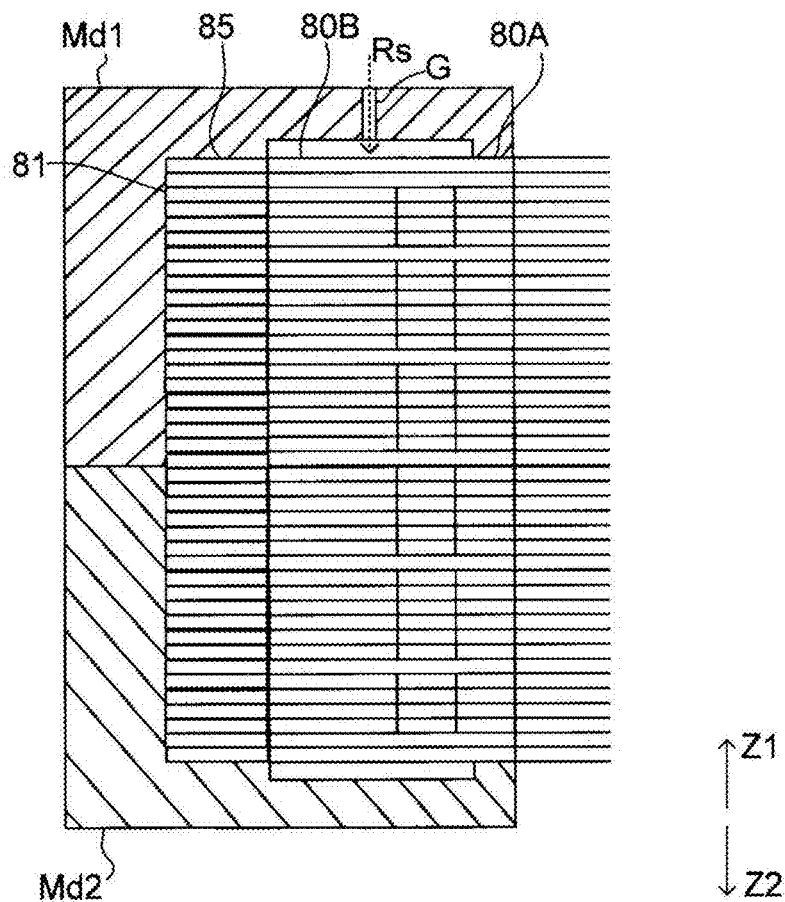
FIG. 15 is a cross-sectional view illustrating a state in which a laminated body is set in a mold.

In the present example embodiment, in the laminating step S20, a plate member having a scrap part 81 and a core plate part is laminated to form a laminated body 85 having the inner core part 80A and the outer core part 80B (see FIG. 15).

Then, in the mold setting step S21, the laminated body is set in the mold. FIG. 15 is a cross-sectional view illustrating a state in which the laminated body 85 is set in a mold. As illustrated in FIG. 15, the laminated body 85 is set so as to be sandwiched from both sides in the axial direction by a first mold Md1 and a second mold Md2.

Then, in the molded body forming step S22, molten resin Rs (filling material) is poured into inner spaces of the first mold Md1 and the second mold Md2 from a gate G formed in the first mold Md1. By hardening the resin Rs, the resin part 90 is formed. As illustrated in FIG. 15, inside the first mold Md1 and the second mold Md2, spaces are provided at both ends in the axial direction of the outer core part 80B. The spaces are filled with the resin Rs and hardened, thereby forming the lid parts 901 and 902.

In such a molded body forming step S22, a molded body is formed as the laminated body 85 in which the resin part 90 is fixed to the outer core part 80B and the inner core part 80A. Then, in the separating step S30, the scrap part 81 is removed from the molded body. After that, in the magnet attaching step S40, when the magnet 13 is fixed to the resin part 90, the configuration illustrated in FIG. 13 is obtained. Then, in the shaft attaching step S50, the shaft 11 is fixed to the inner core part 80A, thereby completing the rotor.

In this way, the method of manufacturing the rotor according to the present example embodiment has, between the laminating step S20 and the separating step S30, the mold setting step S21 of setting the molded body 85 in the molds Md1 and Md2 and the molded body forming step S22 of pouring the molten filling material Rs into the mold and forming the resin part 90, at least a portion of which is located between the outer core parts 80B, so as to form the molded body.

Consequently, even in the case of the outer plate part that is not connected to the inner plate part by the connecting part, because the outer plate part is connected to the scrap part at the time of laminating, it is easy to perform resin molding.

According to the exemplary rotor, motor, and rotor manufacturing method of the present disclosure, magnetic characteristics of the rotor can be improved.

Features of the above-described example embodiments and the modifications thereof may be combined appropriately as long as no conflict arises.

The present disclosure can be applied to, for example, a rotor used for a motor for in-vehicle use or the like, and can be widely applied to various devices including various motors such as a vacuum cleaner, a dryer, a ceiling fan, a washing machine, a refrigerator, and an electric power steering device.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
a shaft extending along a central axis;
a rotor core located radially outward of the shaft, fixed to the shaft directly or indirectly, and including a plurality of thin plate cores laminated; and
a plurality of magnets fixed to the rotor core directly or indirectly; wherein
the rotor core includes:
an inner core portion located radially inward of the magnet;
a plurality of outer core portions located at positions adjacent to a circumferential side surface of the magnet; and
a connecting portion to connect the inner core portion and the outer core portion;
the plurality of outer core portions and the plurality of magnets are alternately arranged in a circumferential direction;
the plurality of magnets are arranged in the circumferential direction so that circumferential end surfaces thereof, which are magnetic pole surfaces, face each other;
a single thin plate core includes an inner plate portion defining a portion of the inner core portion and a plurality of outer plate portions defining a portion of the outer core portion;
at least some of the plurality of laminated thin plate cores include the connecting portion, wherein a number of connecting portions is one or a plurality, and, when the number of connecting portions is a plurality, the connecting portions are disposed at positions other than both left and right sides of each other in the circumferential direction;
in plan view, the thin plate core includes the connecting portion at a position different from that of a connecting portion in another thin plate core adjacent in an axial direction; and
in at least a portion of the at least some of the thin plate cores, the thin plate cores are laminated axially upward from a bottom until positions of the connecting portions included in the thin plate cores located at a top and the bottom coincide in plan view, and positions of the connecting portions included in the thin plate cores adjacent to an axially upper side are shifted in a predetermined direction in the circumferential direction in plan view.

2. The rotor according to claim 1, wherein the thin plate core disposed on at least one of an axially upper end and an axially lower end of the rotor core includes a plurality of connecting portions to connect the inner plate portion and all of the outer plate portions.

3. The rotor according to claim 2, wherein the outer plate portion included in the thin plate core disposed at the axially upper end of the rotor core includes a facing portion facing the magnet on an axially lower end.

4. The rotor according to claim 1, wherein the number of connecting portions included in the at least some of the thin plate cores is at least two, and the connecting portions are disposed to be rotationally symmetrical.

5. The rotor according to claim 1, wherein, with the thin plate core located at the top as the bottom, the thin plate cores are laminated again while the connecting portions are shifted in a same direction as the predetermined direction in plan view.

6. The rotor according to claim 1, wherein a claw portion protruding in a circumferential direction is disposed at a radially outer side of the outer core portion.

7. The rotor according to claim 6, wherein the claw portion is located at a radially outer side of the outer plate portion connected by the connecting portion.

8. The rotor according to claim 6, wherein the claw portion is not provided at the outer plate portion which is not connected by the connecting portion.

9. The rotor according to claim 6, wherein a position of the claw portion is shifted in the predetermined direction in the circumferential direction in plan view as the thin plate core moves upward by as much as a single layer.

10. The rotor according to claim 1, wherein
a resin portion is fixed to the rotor core; and
the resin portion is capable of contacting the magnet.

11. A motor comprising:
the rotor according to claim 1;
a stator surrounding a radially outer side of the rotor; and
a housing accommodating the rotor and the stator.

* * * * *